United States Patent [19]

Takeuchi

[11] Patent Number: 5,239,393
[45] Date of Patent: Aug. 24, 1993

[54] IMAGE READING APPARATUS

[75] Inventor: Yukitoshi Takeuchi, Yokohama, Japan

[73] Assignee: Canon Kabushiki Kaisha, Tokyo, Japan

[21] Appl. No.: 945,698

[22] Filed: Sep. 16, 1992

Related U.S. Application Data

[60] Division of Ser. No. 724,466, Jun. 27, 1991, Pat. No. 5,164,845, which is a continuation of Ser. No. 419,718, Oct. 11, 1989, abandoned.

[30] Foreign Application Priority Data

Oct. 14, 1988 [JP] Japan .................................. 63-258556
Jan. 31, 1989 [JP] Japan .................................. 1-019547

[51] Int. Cl.$^5$ .............................................. H04N 1/17
[52] U.S. Cl. ..................................... 358/474; 358/412; 358/413; 358/421; 358/422; 358/420
[58] Field of Search ............... 358/401, 406, 409, 410, 358/412, 413, 414, 419, 421, 422, 423, 486, 498, 439, 474, 437, 497, 434, 420

[56] References Cited

U.S. PATENT DOCUMENTS

| | | | |
|---|---|---|---|
| 4,160,279 | 7/1979 | Fuwa | 358/486 |
| 4,217,611 | 8/1980 | Ogawa | 358/483 |
| 4,663,672 | 5/1987 | Sakamoto | 358/409 |
| 4,712,139 | 12/1987 | Kato | 358/439 |
| 4,843,480 | 6/1989 | Nishikawa et al. | 358/498 |
| 4,857,817 | 8/1989 | Kugioka | 318/696 |
| 4,862,284 | 8/1989 | Murata | 358/486 |
| 4,864,416 | 9/1989 | Ishikawa | 358/486 |
| 4,992,888 | 2/1991 | Nagashima | 358/410 |
| 5,062,006 | 10/1991 | Miura | 358/410 |
| 5,157,505 | 10/1992 | Hashimo et al. | 358/498 |
| 5,164,845 | 11/1992 | Takeuchi | 358/410 |

FOREIGN PATENT DOCUMENTS 58-170169 10/1983 Japan .
63-233663 9/1988 Japan .
63-245577 10/1988 Japan .................................. 358/412

OTHER PUBLICATIONS

"Electronics Designer's Handbook," by Giacolleta, 2d Ed., pp. 1-138 to 1-139.

Primary Examiner—Edward L. Coles, Sr.
Assistant Examiner—Jerome Grant, II
Attorney, Agent, or Firm—Fitzpatrick, Cella, Harper & Scinto

[57] ABSTRACT

An image processing system has a reading device for reading an image of an original line by line, which repeats the reading operation at a predetermined cycle. A moving device moves an image reading position of the reading device in accordance with a driving signal. A driving device supplies to the moving device the driving signal for moving the image reading position of the reading device by a pitch line during a time period of the reading operation of a line. A computer generates a signal for instructing resumption of image reading by the reading device after interruption of the image reading. The driving device initiates supply of the driving signal to the moving device before the reading operation, upon reception of the image reading resumption signal generated from the computer.

24 Claims, 15 Drawing Sheets

IMAGE READING APPARATUS

This application is a division of application Ser. No. 07/724,466, filed Jun. 27, 1991, now U.S. Pat. No. 5,164,845 which in turn is a continuation of application Ser. No. 07/419,718, filed Oct. 11, 1989, now abandoned.

BACKGROUND OF THE INVENTION

1. Field of the Invention

The present invention relates to an image reading apparatus for reading an image on the original.

2. Related Background Art

The applicant of the present invention has proposed the image reading apparatus used for a digital copying machine, a image reader, and facsimile or the like in U.S. Pat. No. 4,864,416, U.S. application Ser. No. 917,549, U.S. Pat. No. 4,663,672 etc. Some of these apparatuses employ the so-called optical system which scans the original placed on the glass of the original table by a light source and a mirror and forms its image on the read sensor. As illustrated in FIG. 1. The optical system illuminates the original P placed on the fixed glass 100 of the original table by a rod-shaped light source 101, reflects upon the required light of the image, which is the reflection of original P, by mirrors 102, 103 and 104 and further focuses the light of the image on the read sensor 106 such as a one-dimensional CCD image sensor, through the image forming lens 105.

In this case, the length of the light path extending from the surface of the original to the image forming lens 105 is always kept constant by setting the scanning speed of mirror 103 and 104 in the direction of arrow Q at a speed equal to one-half of the scanning speed in the direction of arrow Q of light source 101 and mirror 102.

Among this kind of image reading apparatus, there are some which require repeated interruption/resumption of reading whenever necessary during reading of one page of the original for convenience of the recipient of data. For example, in the case of an image scanner for computer input, when the buffer of the host computer for temporary storage of received data becomes full, the temporary reading by the image scanner is suspended and reading is resumed when the data processing by host computer is completed and input becomes possible.

That is, the image scanner shown in FIG. 1 sends the image data to the host computer upon receipt of a data output demand signal from the host computer (not indicated in the Figure) and the host computer first stores the delivered image data in the buffer memory and then processes the image by taking out the image data stored in the buffer memory one after another. Here, if the said buffer memory becomes full of image data (hereinafter called the Buffer Full State) while the host computer is processing the image (hereinafter called the Busy state), the host computer sends a data output stop signal to the said image scanner to avoid overflow of delivered data, and thereby suspends the temporary reading. When the said host computer is liberated from Busy state and buffer memory becomes empty of image data (hereinafter called Buffer Empty), the host computer sends the data output demand signal to the image scanner and the image scanner resumes reading.

When such interruption/resumption is done while reading of one page of the original, the problem may occur that the images before and after the point of interruption of reading do not properly match each other and the picture quality deteriorates.

Generally speaking, a read sensor such as a CCD image sensor is driven by pulses of a fixed interval, from the necessity to keep the reading output uniform. On the other hand, in order to ensure a smooth start/stop of the pulse motor which causes light source, mirror etc. to scan, it is indispensable to have a slow up/slow down control. Therefore, in order to properly match the images before and after interruption/resumption of reading, it is necessary to simultaneously satisfy the aforementioned two requirements which are fundamentally contradictory with each other.

To solve this problem, with the conventional image reading apparatus, the exposure scanning system is caused to retreat by n lines after interruption if n lines are necessary for slow up and when the system is resumed, slow up is made during this n line delay and image reading is begun from the (n+1)th line, thus properly matching the image to the image before the interruption but such arrangement causes s substantial delay of processing speed.

In a case where the pulse motor must be started and stopped by the specified driving frequency pulses in the state where scanning is being performed under stationary conditions (hereinafter called the Stationary State), the rotation frequency of the pulse motor under the Stationary State must be set within the range where the performance can follow-up the driving frequency of pulse motor, that is, within the range of the auto-start up frequency to meet the torque necessary for performing the said scanning. In addition, it is necessary to provide a sufficient torque margin taking into account the variation of load due to change of environmental temperature and decrease of torque of the motor itself. Therefore as illustrated in FIG. 2, when the number of pulses required for forwarding the motor by 1 line is N and the cycle of reading interval of the CCD image sensor is T, the driving frequency of pulse motor is N/T (pps) and when the driving load is $t_1$ (Kg·cm) and the pull-in torque for driving frequency N/T (pps) is $t_2$ (Kg·cm), the motor start up torque $t_s$(Kg cm) is so set as to satisfy $t_1 < t_s < t_2$ and $t_s - t_1$ under this state becomes the torque margin Mt. This torque margin Mt should theoretically be smaller at the Stationary State than at start up time but it is in reality by far larger at the Stationary State than at start-up time. Excessive torque becomes the cause of vibration of the motor itself or the scanning system and in particular at the time of stopping, it falls into a state as if an emergency brake has been engaged and as a result clattering of the motor itself and the scanning system due to vibration becomes substantial. In other words, when interruption/resumption performance is made during reading, the image output of the original as shown in FIG. 3A becomes as shown in FIG. 3B and the images before and after the point of interruption/resumption do not connect properly due to the aforesaid vibration and thus picture quality deteriorates.

SUMMARY OF THE INVENTION

The present invention was accomplished in view of the aforementioned facts and provides the image reading apparatus which can read an original image in a preferred manner.

In still another aspect, the present invention provides the image reading apparatus wherein reading of the image is performed without disturbance even when performance is interrupted during reading of the original image.

In still another aspect, the present invention provides the image reading apparatus wherein the reading performance can be resumed in preferred manner even when interruption of reading occurs during reading of the original image.

In still another aspect, the present invention provides the image reading apparatus wherein reading performance can be stopped in a preferred manner even when interruption occurs during reading of the original image.

The aforementioned objectives and effects of the present invention and other objectives and effects will be evident from the following explanation.

DESCRIPTION OF THE PREFERRED EMBODIMENT

Illustrative Embodiment 1

Hereunder is explained the first illustrative embodiment wherein the present invention is applied.

Figure 4A:
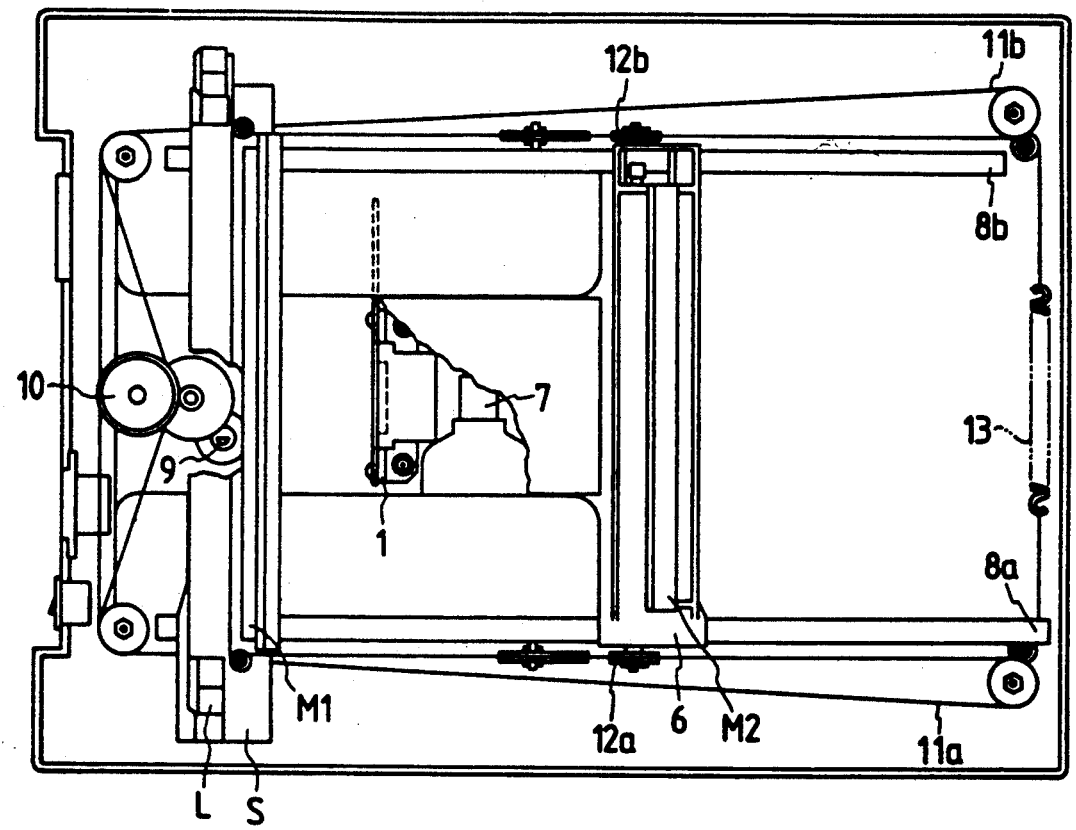
FIGS. 4A and 4B show a schematic view of the construction of the image reading apparatus which practises the present invention.
Figure 4B:
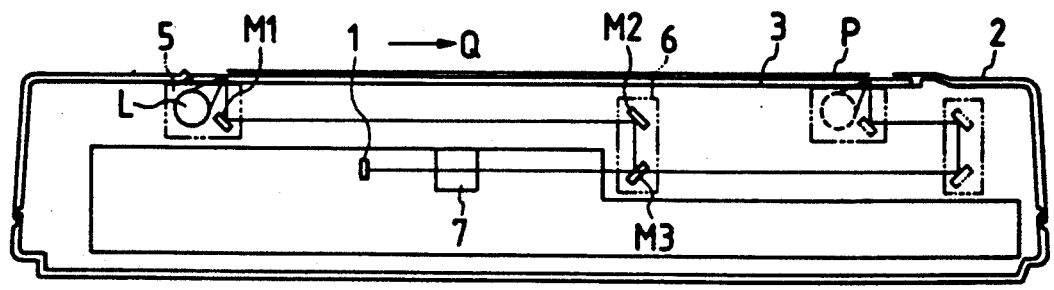

FIGS. 4A and 4B illustrate the outline of the composition of the image reading apparatus of the first illustrative embodiment of the present invention. In the Figure, 1 is read sensor wherein a plural number of light receiving devices such as CCDs used for a reader means are arranged on a straight line, the sensor being installed in the main body 2. At the upper surface of main body 2 is provided the original placing glass 3 so that the original P placed on the original placing glass 3 is exposed and scanned by the exposure scanning mechanism and the image is formed on the read sensor 1.

The exposure scanning mechanism is composed of a wire-driven lamp unit 5, mirror unit 6 and lens 7. Lamp unit 6 is equipped with an illumination lamp L comprising, for example, a rod-shaped halogen lamp, which illuminates the original P and a first mirror M1 which reflects the light of the image coming from the surface of the original irradiated by illumination lamp L toward the mirror unit 6. Mirror unit 6 is provided with the second and third mirrors M2 and M3 which reflects the light of the image reflected by the 1st mirror M1 toward the read sensor 1.

Lamp unit 5 and mirror unit 6 are supported by a pair of rails 8a and 8b so that scanning can be done in parallel to the light axis while holding the position at a right angle to the light axis of the aforementioned lens 7.

Pulse motor 9, which is the driving source to move lamp unit 5 and mirror unit 6 for scanning in the auxiliary scanning direction Q which is perpendicular to the main scanning direction of read sensor 1, the rotary force of the driving source being transmitted to driving drum 10 via a line of gears. Generally speaking, for this sort of image reading apparatus, the pulse motor is frequently used as the driving source because it facilitates position control and speed control. Two wires 11a and 11b connected at one point are wound around the driving drum 10. One end of each wire, fixed to lamp unit 5 at certain point, semi-circles around the outer circumferences of a respective one of pulleys 12a and 12b provided at both ends of mirror unit 6 and is fixed to the main body. The other ends of wires 11a and 11b semi-circle on the outer circumferences of pulleys 12a and 12b and are connected to the tension spring 13. In this way, mirror unit 6 scans at a speed equal to half of the scanning speed of lamp unit 5 according to the principle of a dynamic pulley, and consequently the length of light path from the surface of the original to lens 7 being is held always constant for the entire scanning region.

The lamp unit 5 and mirror unit 6 are normally set on the home position near the starting point of original reading by home position sensor not indicated in the Figure. When a reading start order is received from the host computer connected to the said reading apparatus, a motor driving pulse synchronizing with the read synchro-signal is given to pulse motor 9 and pulse motor 9 rotates to initiate the scanning the exposure scanning mechanism in the direction of auxiliary scanning direction Q and the read image data are transmitted to the host computer.

The host computer processes the received image data. But if the host computer is in the Busy state or its buffer which temporarily stores the received data is full, so that it is impossible to process the image data, the host computer gives a reading interruption command to the reading apparatus. When a reading apparatus receives this command signal, it stops the rotation of motor 9 and stops the travelling scanning of the exposure scanning mechanism stops transmission of image data signal to the host computer and tape a stand-by state. When the buffer becomes empty or conditions otherwise permit, a reading resumption command is given by the host computer and reading is resumed from such point.

Figure 5:
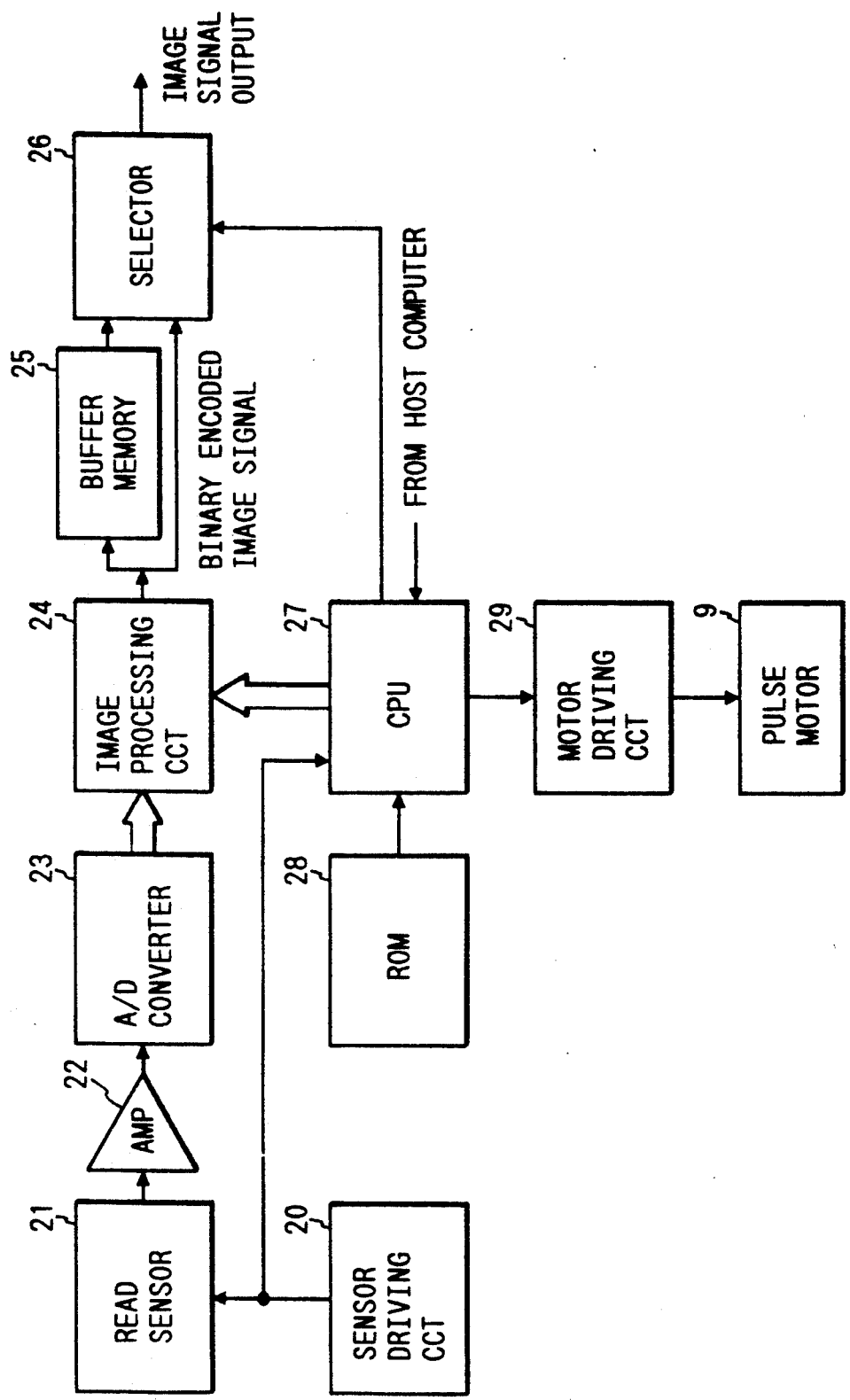
FIG. 5 and FIG. 17 are the block diagrams of the image reading apparatus which practices the present invention.

FIG. 5 is an example of a block diagram for processing of image data read by the image reading apparatus. An analog image signal coming from read sensor 21, driven by the driving signal given by the sensor driving circuit 20, is amplified by the amplifier 22, converted into digital image signal and inputted into image processing circuit 24. At the image processing circuit 24, the digital image signal is converted into a binary signal in accordance with the instruction given by CPU27. CPU27 supplies the threshold value for conversion into a binary signal and the data for shading compensation to the image processing circuit, using the image processing parameter stored in ROM28. According to the reading interruption/resumption command given by the host computer, CPU27 also outputs the driving pulse formed by the internal timer to the motor driving circuit 29 which drives pulse motor 9 based on the driving signal given by the sensor driving circuit 20. The output of image processing circuit 24 is divided into two parts and one part is connected via buffer memory 25 to the second stage selector 26 which performs selection according to the instruction of CPU27 while the other part is connected to the selector 26 directly.

Figure 6:
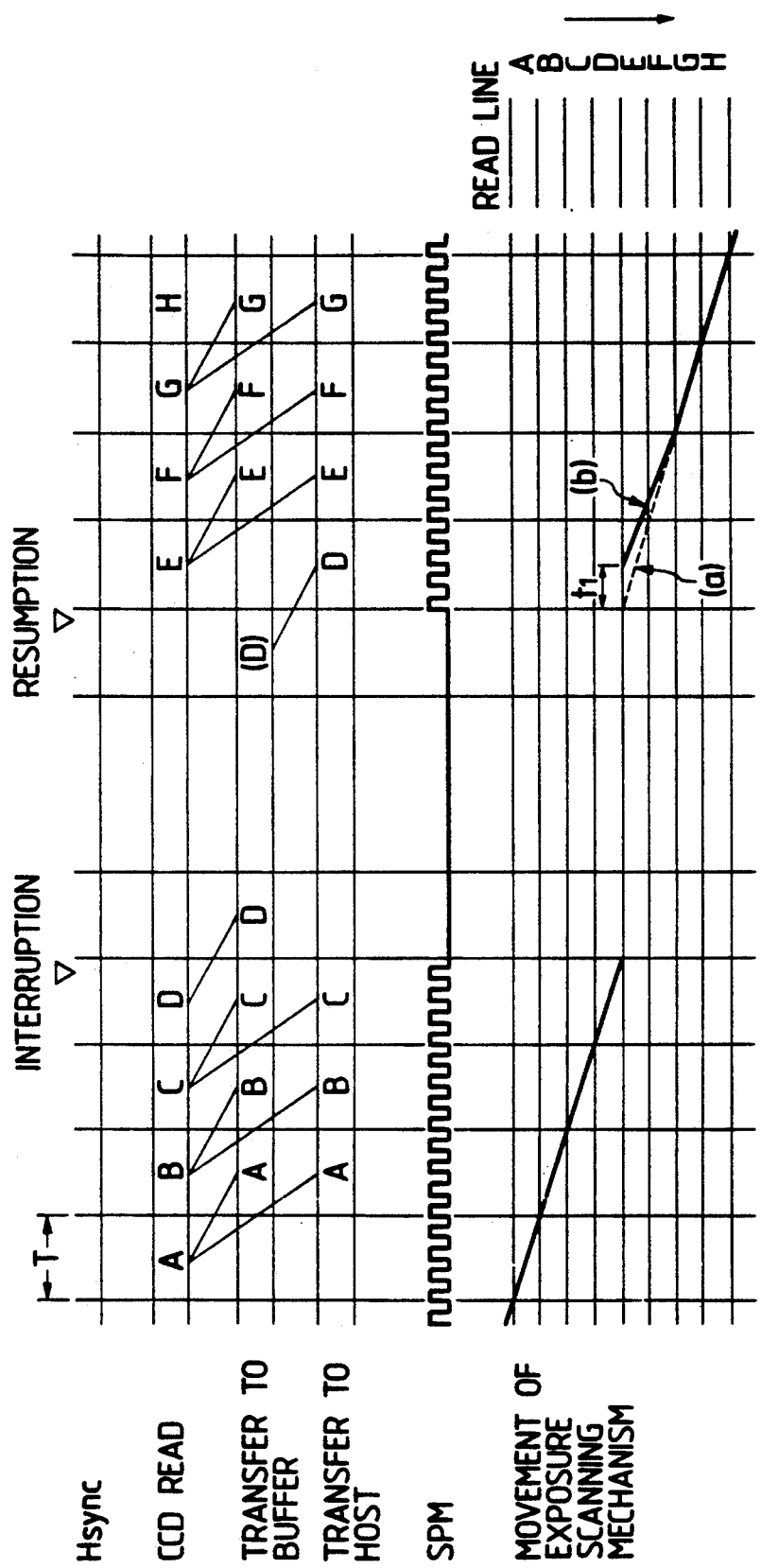
FIG. 6 is a timing chart indicating the image reading performance.

An image sensor such as a CCD usually functions according to the clock signals emitted at a certain interval. To process one line of image data requires two cycles (2T). As illustrated in FIG. 6, in the first cycle, image reading (electric charge accumulation by photoelectric conversion) is executed and in the following cycle, read data is transmitted.

Usually, selector 26 is directly connected to image processing circuit 24 and in the succeeding reading cycle, transfer of data A, B and C to the host computer is executed. However, at the time when host computer emits the reading interruption command, CPU27 stops the output of driving pulse to the motor drive circuit 29. At the same time, the data D of the line being read by reading sensor 21 is not accepted by the host computer in the following cycle but it is transferred to the host computer after resumption of reading. Consequently at the time of resumption of reading, selector 27 is connected to buffer memory 25 by CPU27 and the image data D in the last line having been read prior to the interruption is first transferred from buffer memory 25 to host computer and then selector 26 is changed over by CPU27 to return to the normal state.

Generally speaking to initiate rotation of pulse motor 9, slow up and slow down (to gradually increase or reduce rotation frequency) are used to make a smooth shift from the stopped state to the stationary state or vice versa. However in the case of an image sensor such as a CCD, it is necessary to hold the time span for reading of each line (storage time) constant and consequently the aforementioned slow up/slow down adjustment can not be used at the interruption/resumption of reading (hereinafter abreviated as stop/start), but change over to stop/start must be done abruptly at the rotation frequency of the stationary state from the beginning. In other words, when the storage time per line of image sensor is T and the pulse number of the pulse motor required for transfer of one line is n, the pulse motor must abruptly stop/start at the motor driving pulse of n/T(pps) (SPM of FIG. 6).

Figure 7A:
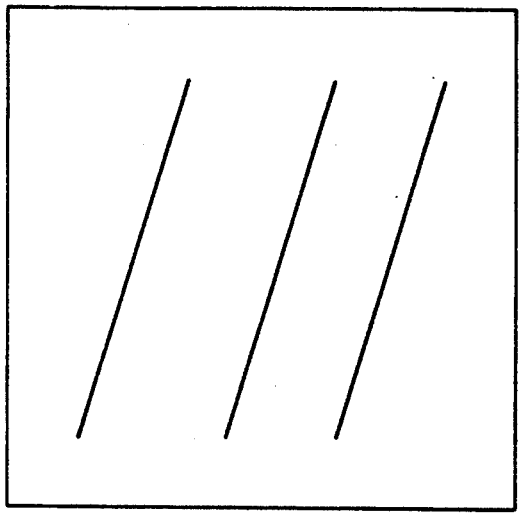
FIGS. 7A and 7B show a view illustrating an example of an image having been read and the reproduced image.
Figure 7B:
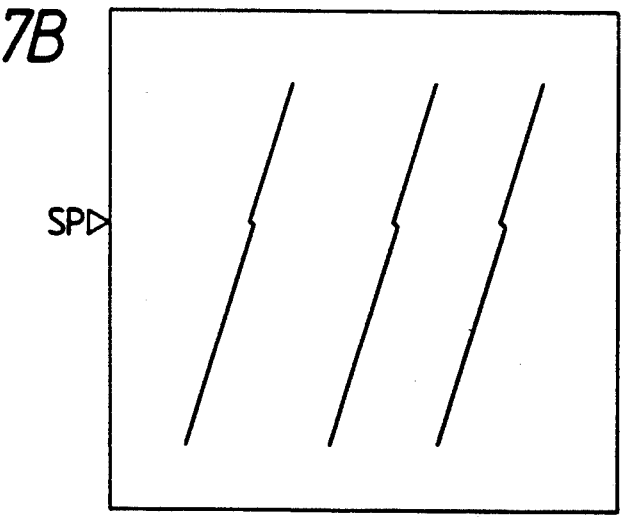

When the apparatus is instructed to read the original as shown in FIG. 7A with stop/start SP motion on the way, the output may be such that the images before and after stop/start SP are not properly connected as illustrated in FIG. 7B. One of the causes for such trouble is the vibration of the exposure scanning means due to abrupt stop/start but even after the influence of such vibration is eliminated, disturbance of the image still remains as illustrated in the FIG. 7B.

In the investigation of the synchro-signal, motor driving pulse, motor rotation and motion of the exposure scanning apparatus immediately after the start, it has been revealed that the exposure scanning mechanism shifts with some delay after giving the motor driving pulse as illustrated by the solid line (b), contrary to our expectation that the motion of the exposure scanning mechanism at the reading of data E should be as shown by the dotted line (a) of FIG. 6.

In FIG. 6, H sync is the reading synchrosignal emitted by sensor driving circuit 20 at every storage time T(m sec) of the image sensor and SPM is the pulse motor driving signal sent from CPU27 to motor driving circuit 29 in synchronism with the signal H sync. In this example, the A line of data is transferred by giving 4 pulses to pulse motor 9 during time T which is a time interval between H sync outputs. Solid line (b) in FIG. 6 indicates that at the start after interruption, there exists a large time lag t1 after the start of rotation of pulse motor 9 until the start of motion of the exposure scanning mechanism. This is due to the delay of follow up of the exposure scanning mechanism from the driving pulse of pulse motor 9.

Figure 8:
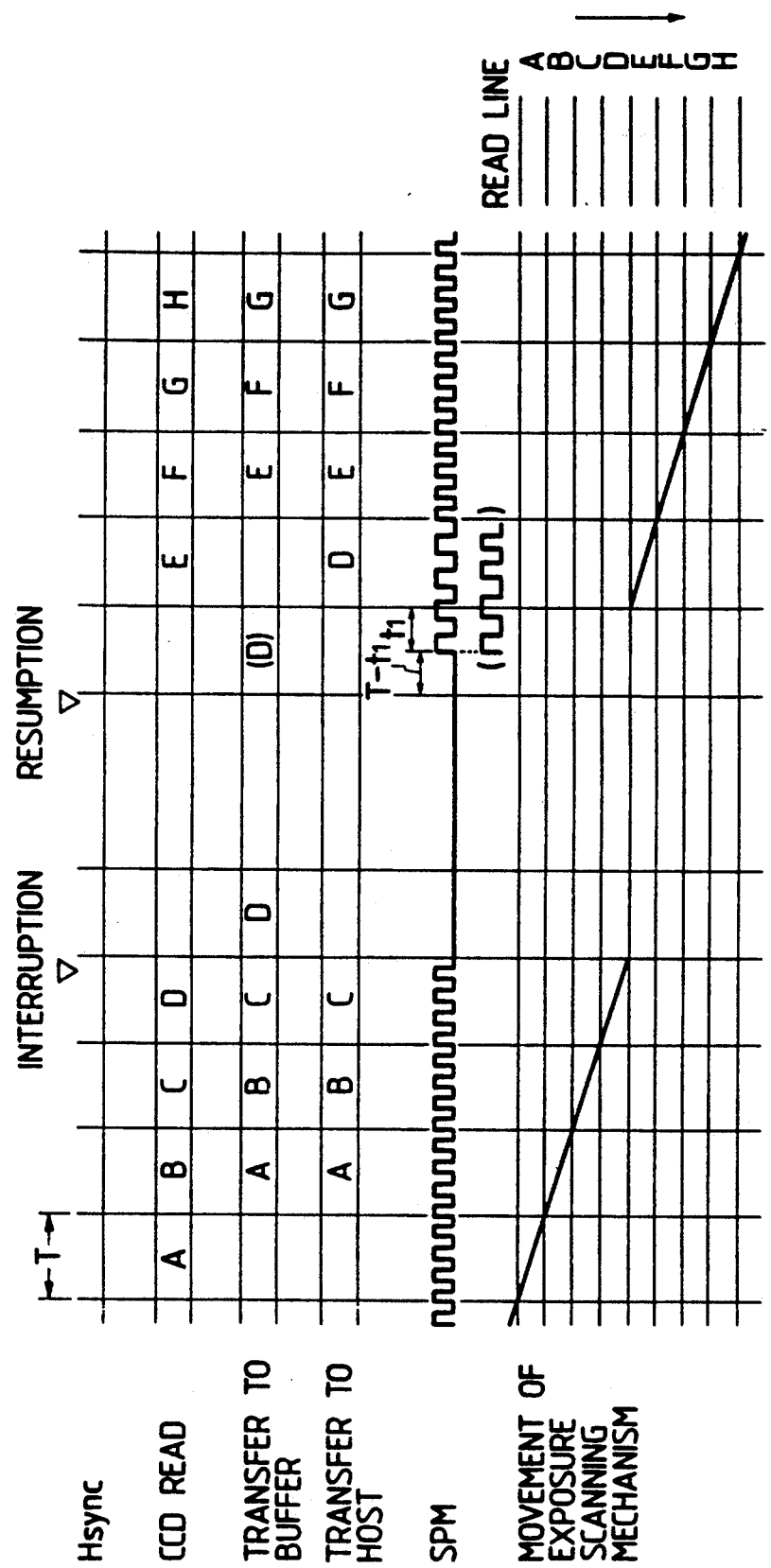
FIGS. 8, 11, 13, 15 and 18 are the timing charts illustrating the performance of the image reading apparatus which practises the present invention.

FIG. 8 indicates the performance sequence for elimination of the disturbance of the image due to time lag t1. After the receipt of the reading resumption command from the host computer, CPU27 emits, immediately after the start, driving pulse SPM for driving pulse motor 9 to the motor driving circuit 27 earlier than the emission of synchro-signal H sync for reading of the first line by the length of said time lag t1. This timing is achieved if the driving pulse is emitted at time $T-t1$ after the input of synchro-signal H sync immediately after the receipt of the reading resumption command. If this is done so, the exposure scanning mechanism starts to rotate simultaneously with the reading synchro-signal H sync. As stated above, in principle, motor driving pulse SPM is emitted in synchronism with synchro-signal H sync, and consequently, during the time span of said time lag plus the time for reading of the 1st line, i.e., during $(t1+T)$ (m sec), it gives 4 pulses to send one line and from the 2nd line on the driving pulse synchronizing with the synchro-signal H sync is given as usual.

The space between 4 pulses for the first line may be one-quarter of $(t1+T)$ or may be distributed otherwise in such a manner that the sum of intervals between 4 pulses becomes $(t1+T)$ as shown in the bracket in FIG. 8.

By performing the control as shown in FIG. 8, the exposure scanning system perfectly follows up the synchro-signal H sync at the time of reading of data E. Therefore the images are connected smoothly even when stop/start motion is made on the way and no image disturbance at the seam mark as shown in FIG. 7B appears.

Even when the aforementioned control is effected at the start of reading of the front end of the original, the image is not at all degraded and therefore it is unnecessary to change the control method depending on whether it is at the start of reading or at the resumption of reading after interruption.

In the aforementioned example, the number of pulses required for transmitting one line is 4 but the present invention may be practiced, in a similar manner irrespective of such pulse number. An explanation was made for the example wherein the means to transmit driving force is gear and wire and the means of exposure scanning is a 1:½ optical system, but the present invention is not limited thereto. For example, the invention may be applied to the systems wherein the driving force transmitting means is a timing pulley and belt or the exposure scanning mechanism is a one-unit type mechanism in which mirror, lens and image sensor are assembled or the composition wherein the positions of mirror, lens, image sensor are fixed and original table glass 3 is shifted by a pulse motor. In order to transfer the data of the line being read immediately before interruption to the host computer at the resumption of reading, a buffer memory 25 is provided as illustrated in FIG. 5 but the workable construction is not limited thereto and performance is similarly possible with such compositions wherein for example a memory comprising RAM etc. which can store the data of plural number of lines is provided and the system is so controlled that the reading start position of the memory in the stationary mode is different from that at the resumption of reading.

Illustrative Embodiment 2

Vibration of the exposure scanning mechanism and elongation and contraction of wire depend largely on the driving method of the pulse motor. That is, motor torque and vibration of the motor change substantially according to the setting of the pulse rate and current rating and such change influences the exposure scanning means and the wire.

In the aforementioned example, explanation was made for the method wherein the exposure scanning mechanism is moved earlier than other systems by the length equivalent to the time lag t1 of the exposure scanning means behind the read synchro-signal, but it is unnecessary to accurately match the lead time of the motion of the exposure scanning mechanism against the synchro-signal H sync to t1. In other words, the lead time $t_2$ of pulse impression start against read synchro-signal H sync may be set at $t_2 = t_1 + dt(-t_1 < dt)$ which is in the range where there should be no influence of time lag on the image.

Figure 9:
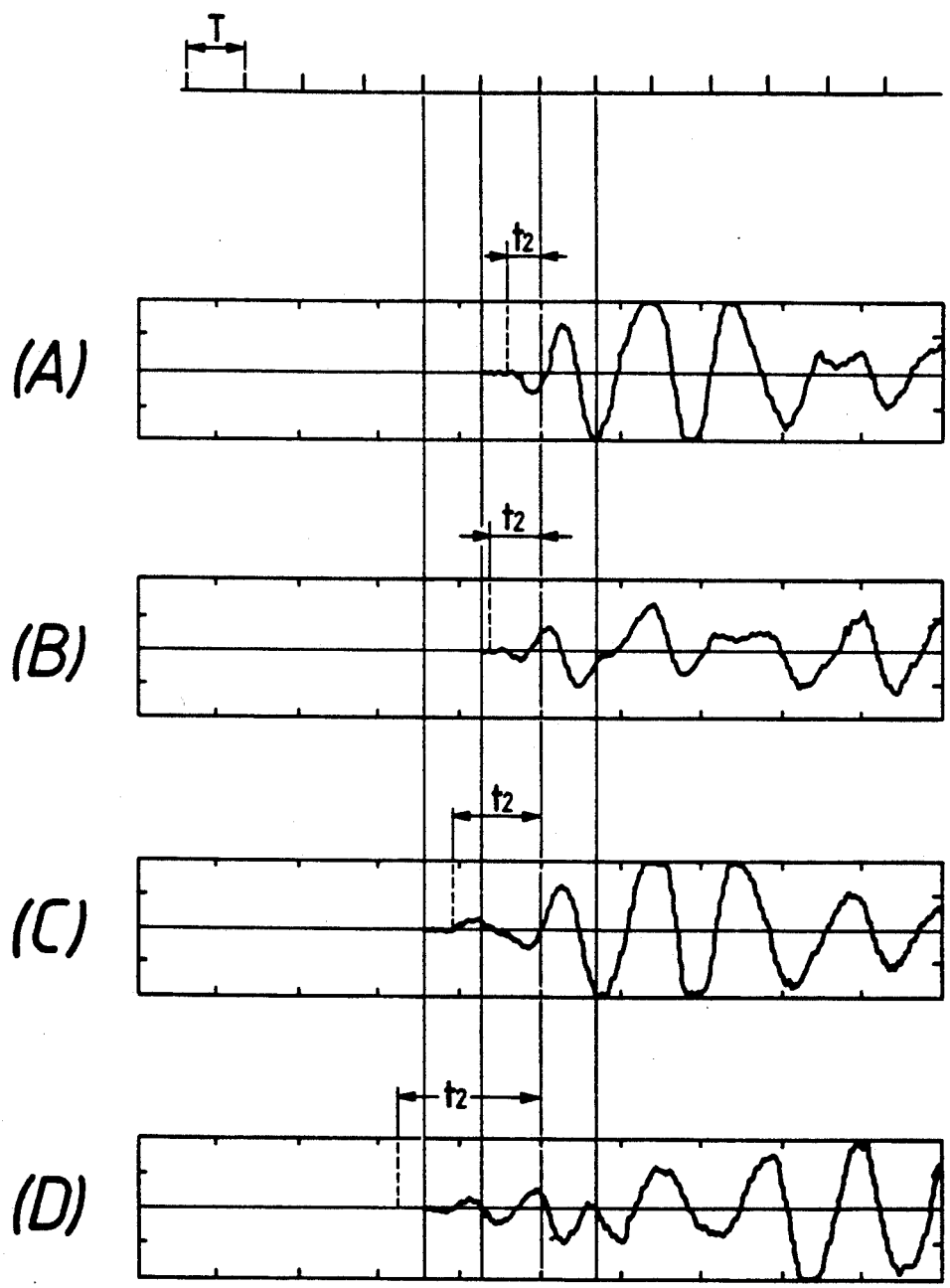
FIGS. 9(a–d) are views illustrating the state of vibration of an exposure scanning mechanism.

FIGS. 9(A-D) shows the results of measurement of vibration of the exposure scanning mechanism under different lead times t2. It is evident therefrom that the vibration of the exposure scanning mechanism depends on t2. Therefore it should be possible to further improve the picture quality by setting t2 at such a level that the time lag is offset and yet vibration becomes minimum.

Illustrative Embodiment 3

When the image reading apparatus is at it stand-by position or when it is stopped by an interruption order from the host computer during reading, a hold current is running through the pulse motor 9 to hold it at the stopped position.

Figure 10:
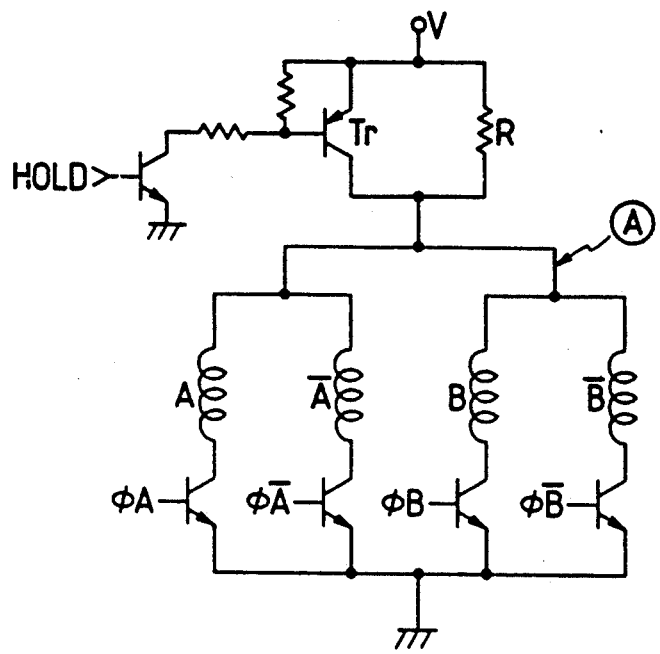
FIGS. 10, 12, 14 and 16 are the driving circuit diagrams of a pulse motor.

FIG. 10 shows an example of constant voltage driving circuit 29 for driving pulse motor, wherein transistor tr in the Figure may be turned OFF by setting the hold signal HOLD at a high level and the current running through the coil of pulse motor 9 may be reduced by impressing a DC voltage on pulse motor 9 via resistor R.

Figure 11:
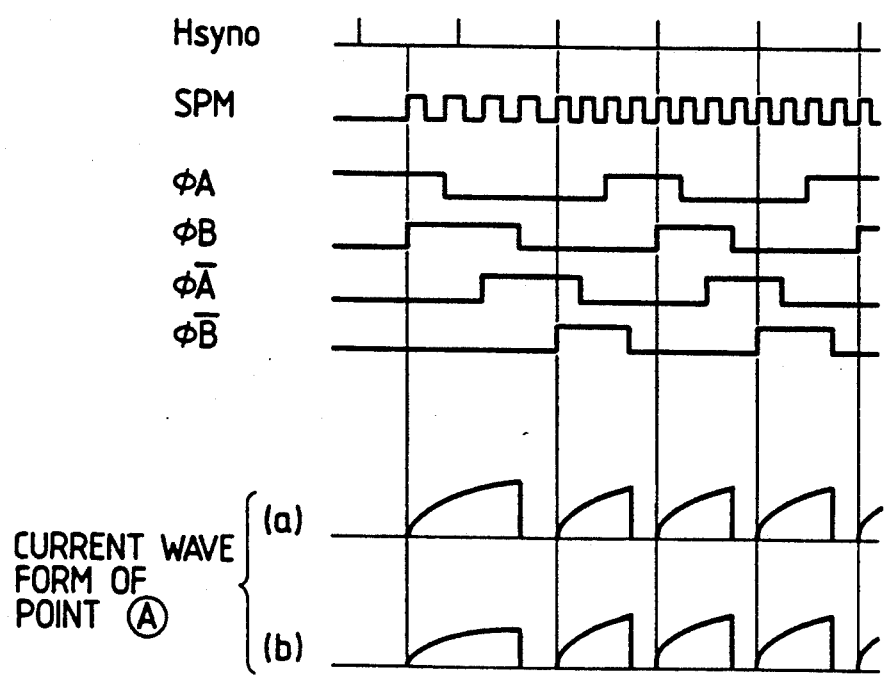

In the example shown in FIG. 8, the frequency of pulses supplied to pulse motor 9 at the start is small and therefore the starting torque may be smaller than the torque during a stationary run but to the contrary in the constant voltage driving, as shown in (a) of FIG. 11 the current running through pulse motor 9 increases by an amount equivalent to the extention of pulse interval at point Ⓐ of FIG. 10. Such excessive torque becomes the cause of the vibration of exposure scanning mechanism. Consequently it is possible to suppress; such vibration at the start by reducing the current supplied to pulse motor 9 using the said HOLD circuit shown in (b) of FIG. 11.

Figure 12:
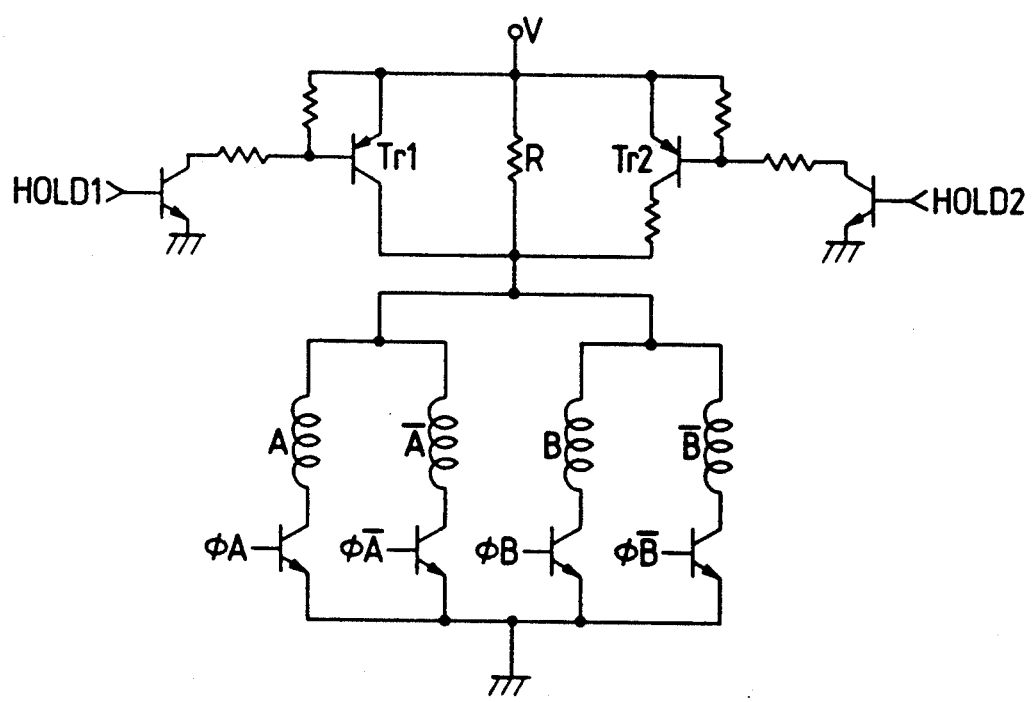

The foregoing paragraphs introduce a method to suppress vibration without changing the existing circuit but as illustrated in FIG. 12, the system may be so constructed that the number of bypass is increased and the circuits used at starting time and those used at holding time may be separated so that at the stop, hold signals HOLD 1 and HOLD 2 are set at a high level and transistors tr1 and tr2 are both turned OFF, whereas at the start, only hold signal HOLD 1 is set at a high level and transistor tr1 and tr2 are set at OFF and ON state, respectively, thus suppressing the current to be impressed on pulse motor 9 at the stop and the start.

Illustrative Embodiment 4

Figure 13:
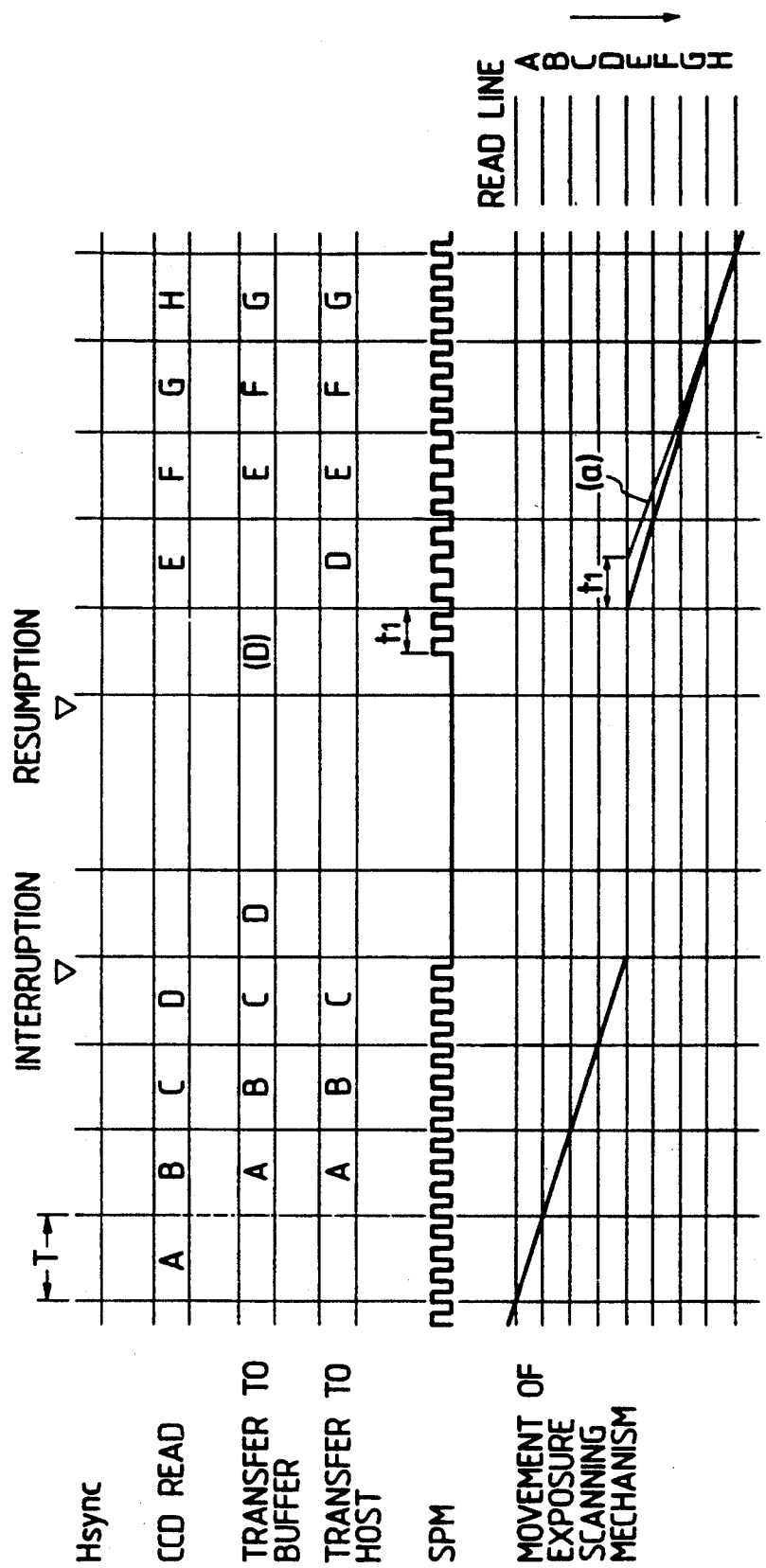

In the first embodiment, for example, it was assumed that from the second line after the resumption of reading, the exposure scanning means can follow up the read synchro-signal, but depending on the weight of the exposure scanning mechanism etc., a time lag may still exist even at the second line for reading data F as shown in (a) of FIG. 13.

In such case, during the initial time lag plus the time for reading two lines, i.e., (t1+2T), driving pulses for 2 lines, namely, 8 pulses may be given. But in this case, once reading starts, it must read at least two lines and therefore buffer memory 25 for image disposal in FIG. 5 requires the minimum capacity of 2 lines of data.

Likewise if the time lag exists for n lines, the influence of the time lag may be reduced by distributing 4*n pulses over the time span of (t1+n*T). In this case, a line buffer with minimum capacity of n lines is naturally required.

In this illustrative embodiment, the method introduced in second or third embodiment may be employed.

As explained above, with the image reading apparatus of the present invention, even when a Stop/Start action is entered in the process of reading an original, a smooth image as good as the one obtained by continuous reading can be obtained.

In practising the above construction, there is another significant advantage, that is, it accompanies no additional expenditure.

To give a driving pulse to the motor prior to the read synchro-signal means essentially a slow up operation and it has the concurrent effect to reduce vibration of to the exposure scanning mechanism due to shock at the start. Through the multiplication effect of these elements, a substantial improvement of the quality of the read image is obtained.

Illustrative Embodiment 5

In the illustrative embodiments given above, the pulse motor drive control at the time of resumption of reading after interruption has been explained but as stated above, a disturbance of the image occurs not only at the resumption of reading but also at the stop for interruption due to the vibration of the exposure scanning mechanism.

In the illustrative embodiment 5, an explanation shall be made on the prevention of vibration of the exposure scanning mechanism at the stop.

Figure 14:
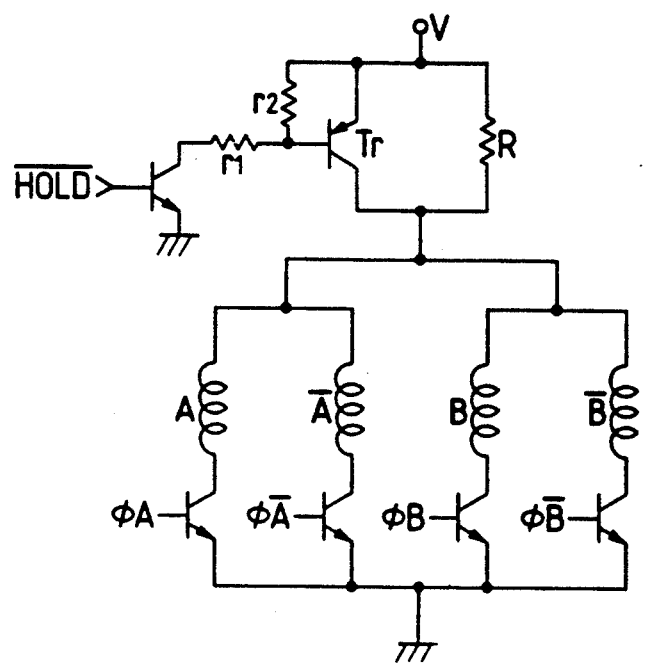
Figure 15:
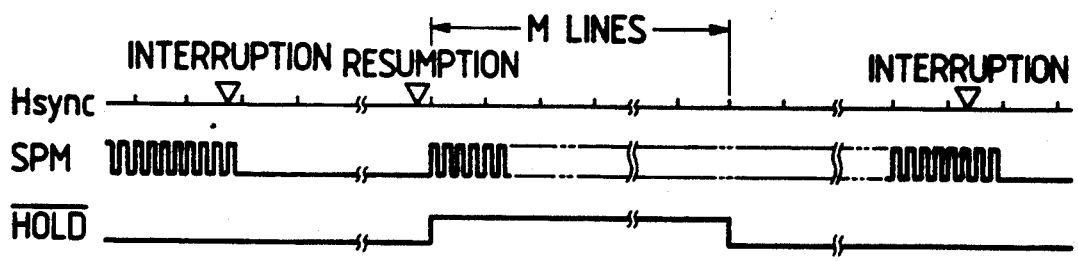

As stated above, it is necessary to run a holding current through pulse motor 9 to keep it in the stopped state (hereinafter called the Hold time), but the rating of such current may be smaller than that at the start up and therefore the motor driving circuit 29 is usually provided with a circuit which enables to change over of the current rating given to pulse motor 9 in two steps, namely, the rating for the stopped state and that for the stationary state, for example, as illustrated in FIG. 14. Using the above circuit, at the time of start or resumption of reading, hold signal $\overline{\text{HOLD}}$ given to transistor Tr is set at High to turn ON the transistor Tr and impress a DC voltage directly on the pulse motor 9. As illustrated in FIG. 15, when rotation of pulse motor 9 reaches the stationary state after the time for scanning M lines (M≧1) after start or resumption of reading, hold signal $\overline{\text{HOLD}}$ may be set at low, transistor Tr may be turned OFF and the DC current may be impressed on pulse motor 9 via resistor R for reading the lines M+1 and on, so that the current running through the coil of pulse motor 9 is reduced and consequently the torque of pulse motor 9 may be reduced pro rata thereto. Here the resistor R is so set that the pulse motor 9 is given the current rating which provides the torque with sufficient margin over the torque necessary for pulse motor 9 at the stationary state. While the reading is suspended upon receipt of the data output stop signal from the host computer, the hold signal $\overline{\text{HOLD}}$ is kept Low after the aforementioned change-over of current. Therefore the current rating given to pulse motor 9 in the stationary state is identical to the current rating at Hold time, which is smaller than the current running at start up and thus excessive torque is reduced and consequently vibration of the exposure scanning mechanism at the stop is reduced. Since the circuit of a conventional apparatus may be used as it is, the practice of this invention accompanies no additional expenditure.

Illustrative Embodiment 6

Figure 16:
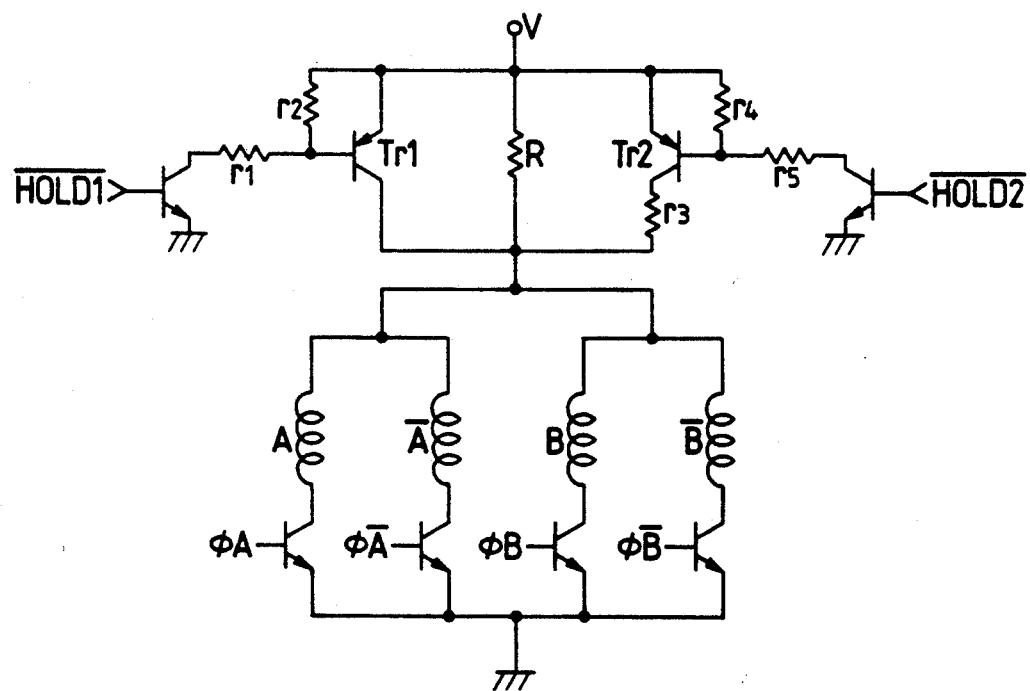

Next the Illustrative Embodiment 6 of the present invention is explained in reference to FIG. 16.

The same expressions as those used in the aforementioned illustrative embodiment 1 are given the same symbols. The circuit used in this Illustrative Embodiment is so constructed that additional transistors and resistors are provided to the circuit of Illustrative Embodiment 5 so that the current rating given to pulse motor 9 may be changed over in 3 modes, namely, the start up mode, stationary mode and Hold mode and thus the Hold current in this Illustrative Embodiment is set further smaller than the current rating at the stationary mode and consequently vibration and an unnecessary temperature increase within the main body of equipment 2 at the Hold state are reduced to the level less than those in the Illustrative Embodiment 1.

Explanations of other constructions and performances are omitted as they are same as those of Illustrative Embodiment 5.

Illustrative Embodiment 7

Figure 17:
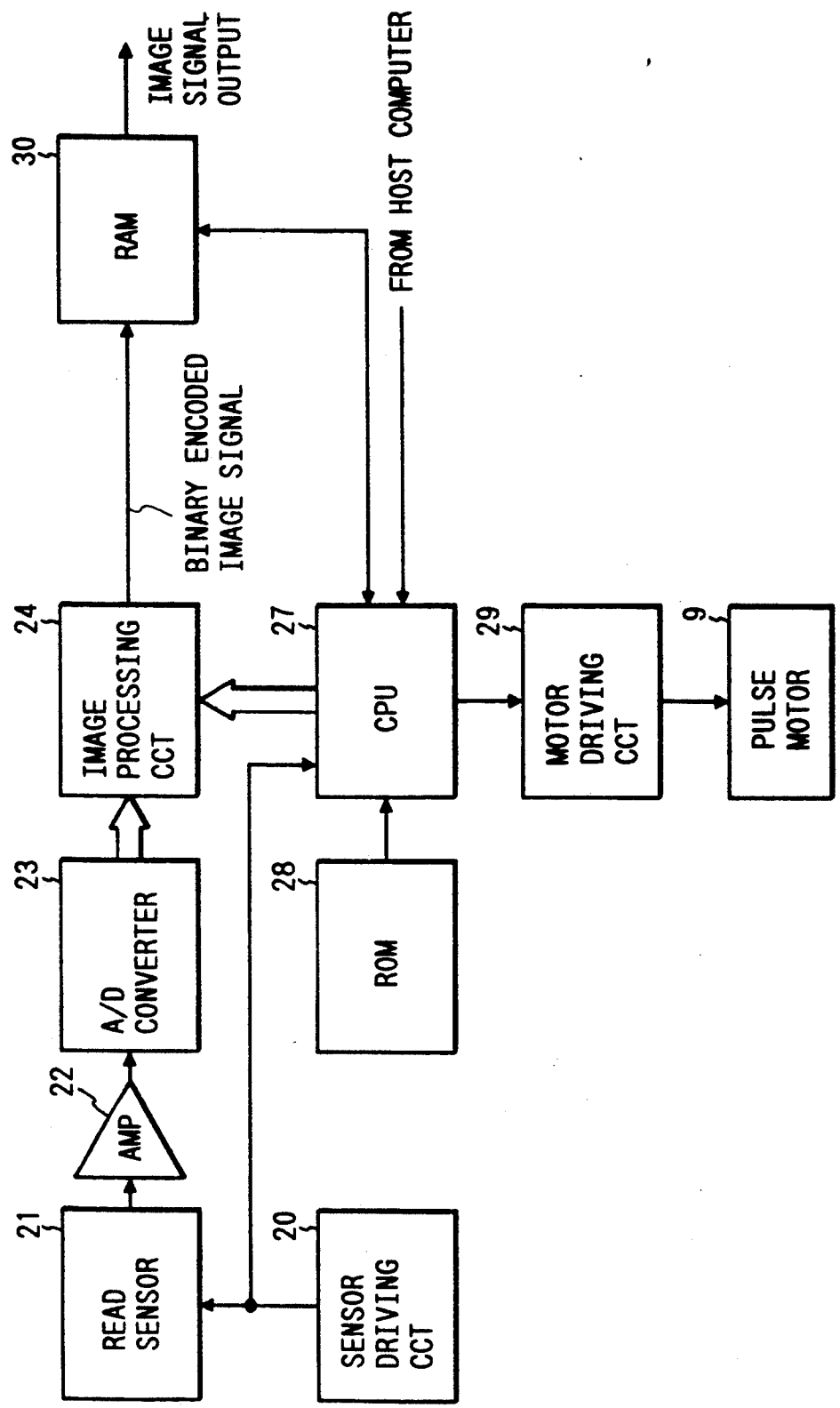
Figure 18:
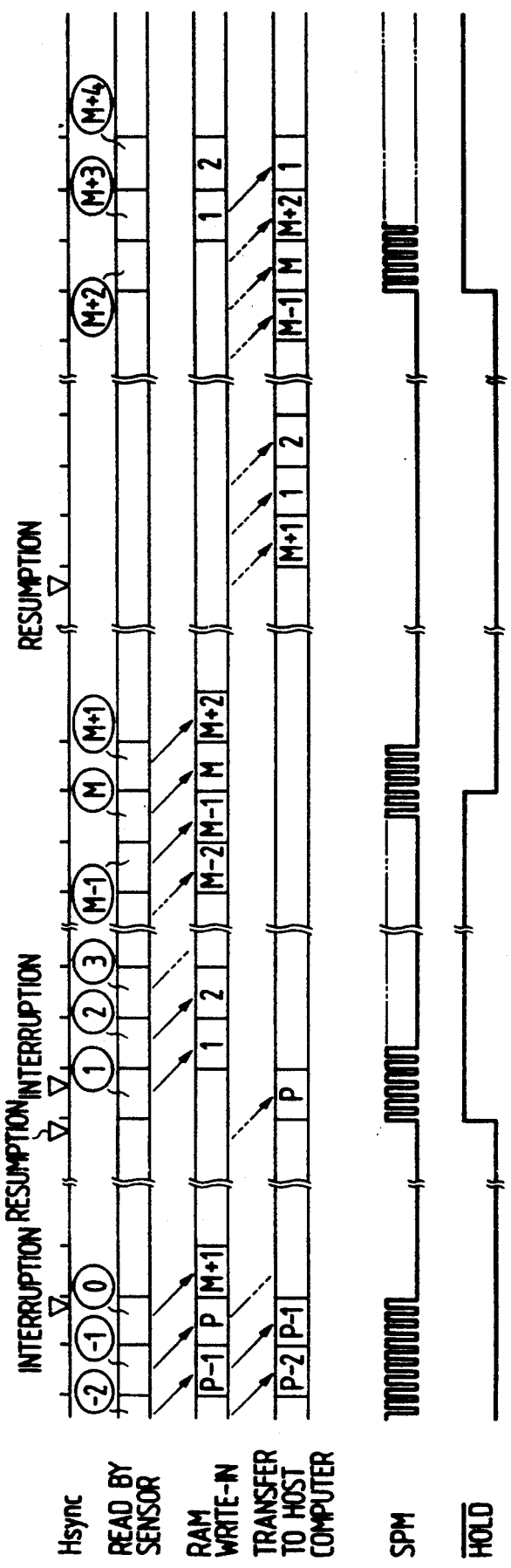

Next the Illustrative Embodiment 7 of the present invention is illustrated in FIGS. 17 and 18 and the construction of its control is explained in reference to FIG. 17. For the same expression among those of Illustrative Embodiment 1, the same symbol shall be used.

CPU27 in this Illustrative Embodiment is provided with RAM 30 which can store M lines of image data whenever the pulse motor 9 reaches the stationary state within the time for scanning M lines (M≧1) by the reading means and such RAM 30 is controlled by CPU27. In the following cycle, the image signal read by read sensor 21 is entered into RAM 30 via image processing circuit 24 and sent to the host computer in the succeeding cycle wherein the order of processing is predetermined so that the data of the 1st line after the start or resumption of reading are entered into the 1st area of the RAM, and the data of the 2nd line into the 2nd area of RAM and so on, and thus the minimum unit from the data output demand signal up to the data output stop signal given by host computer is one line.

Next an example of the performance of this Illustrative Embodiment is explained in reference to FIG. 18.

First, the lines to be read after resumption of reading are numbered (1), (2), (3) and'on and the lines having been read prior thereto are numbered progressively backward as (0), (−1), (−2) and on. If the data output stop signal is received during reading of line (0), this is during the time when the data of line (−2) in RAM 30 (the data in area P-1 in the Figure) are being transferred to the host computer and the data of line (−1) are being entered into area P of RAM 30. In the following cycle, the data of line (0) are entered into area M+1 of RAM 30. After resumption of reading, when host computer gives the data output stop signal again, the exposure scanning mechanism does not stop immediately but as stated above, it continues to scan for the number of lines (M+1) necessary for stable operation. Thus to the host computer are transferred only the data in area P. The data of lines (1), (2), (3) and so on which have been read after the receipt of the data output stop signal are entered into area 1, 2, 3 and so on of RAM 30 one after another but the data of line (M+1) are entered into area M+1 because the data of area M+1 [data of line (0)] have not been transferred yet. When reading is resumed next, the exposure scanning mechanism does not start scanning immediately but first the data of RAM, 30 are transferred in the order of area M+1, 1, 2 ... M−1, M, M+2 and simultaneously with the start of transfer of data in area M, the exposure scanning mechanism resumes scanning and entry of image data into RAM 30 begins. That is, while the exposure scanning mechanism is continuously scanning, entry into RAM 30 is repeatedly made in the order of 1, 2 ... M, 1, 2 ... and the data read at the receipt of the data output stop signal are entered interchangeably into M+1 or M+2.

Therefore in this illustrative Embodiment, even when the data output stop signal is received from the host computer before the exposure scanning mechanism reaches stationary state, scanning does not stop immediately but it stops when the torque of the pulse motor becomes small so that the vibration of the exposure scanning mechanism at the stop is suppressed.

Explanations of other constructions and performances are omitted as they are the same as those described in Illustrative Embodiment 1.

In the aforementioned Illustrative Embodiments 5–7, explanation was made by assuming that the number of pulses required for transfer of 1 line is 4 but the present invention may be practised irrespective of pulse number.

Explanation was also made on the example wherein gear and wire are used as the driving force transmitting means and a 1:¼ optical system is used for the optical scanning means but the present invention is not limited thereto and is applicable for example also to such mechanisms in which a timing pulley and belt are used for the driving transmission means and a one unit type optical scanning means incorporating mirror, lens and sensor in one unit is used.

As explained above, in the present invention unnecessary torque of the driving means is reduced, vibration of the driving means and the scanning system is suppressed and the system can be stopped without vibration even when an interruption/resumption order is entered during reading of image and thus smooth picture with quality as good as that obtained by continuous reading can be obtained.

Besides, since no additional time is required for reading, the speed of reading does not decrease.

While the present invention has been explained in reference to a few preferred illustrative embodiments, it should be understood of course that the present invention is not limited to the composition of the said illustrative embodiments since many deformations and modifications are possible within the scope of the claim.

I claim:

1. An image processing system comprising:
   reading means for reading an image of an original line by line, said reading means repeating the reading operation at a predetermined cycle;
   moving means for moving an image reading position of said reading means in accordance with a driving signal; and
   driving means for supplying to said moving means the driving signal for moving the image reading position of said reading means by a pitch line during a time period of the reading operation of a line, and
   computer means for generating a signal for instructing resumption of image reading by said reading means after interruption of the image reading;
   wherein said driving means initiates supply of the driving signal to said moving means before the reading operation, upon reception of the image reading resumption signal generated from said computer means.

2. A system according to claim 1, wherein said driving means stops movement of the image reading position by said moving means in accordance with an image reading interruption instruction by said computer means, and starts movement of the image reading position by said moving means in accordance with an image reading start instruction by said computer means.

3. A system according to claim 1, further comprising memory means for storing an image signal generated from said reading means at the time of termination of a preceding image reading, and wherein the image signal stored in said memory means is output in response to an initiation of a subsequent image reading.

4. A system according to claim 1, wherein said driving means initiates supply of the driving signal to said moving means in accordance with an image reading start instruction provided by said computer means.

5. A system according to claim 1, wherein said reading means comprises a charge-accumulating image sensor, and wherein said image sensor repeats a charge-accumulating function operation at the predetermined cycle.

6. A system according to claim 1, wherein said moving means moves the image reading position of said reading means with a pulse motor.

7. A system according to claim 6, wherein said driving means supplies to said moving means the pulses for driving said pulse motor.

8. A system according to claim 6, further comprising control means for controlling an amount of current to be supplied to said pulse motor, wherein the amount of current at the time of initiation of the image reading is selected to be less than an amount of current during the movement of the image reading position.

9. An image processing system comprising:
   reading means for reading image of an original line by line;
   moving means for moving an image reading position of said reading means;
   control means controlling movement of the image reading position by said moving means; and
   computer means for generating a signal for instructing resumption of image reading by said reading image after interruption of the image reading;
   wherein said control means stops movement of the image reading position in response to an image reading interruption instruction, when the image reading interruption instruction by said computer means is provided after movement of the image reading position is stabilized, and wherein said control means stops movement of the image reading position after movement of the image reading position by a pitch corresponding to a predetermined number of lines, when the image reading interruption instruction by said computer means is provided before movement of the image reading position is stabilized.

10. A system according to claim 9, further comprising memory means for storing image signals of a predetermined number of lines from said reading means in accordance with the image reading interruption instruction.

11. A system according to claim 9, wherein said control means controls aid moving means in accordance with the image reading interruption instruction provided by said computer means.

12. A system according to claim 9, wherein said reading means comprises a charge-accumulating image sensor, and wherein said image sensor repeats a charge-accumulating operation at the predetermined cycle.

13. A system according to claim 12, wherein said control means controls said moving means to stop movement of the image reading means in accordance with the image reading interruption instruction by said computer means, and wherein said control means starts movement of the image reading position by said moving means in accordance with an image reading start instruction by said computer means.

14. A system according to claim 9, wherein said moving means moves the image reading position of said reading means with a pulse motor.

15. A system according to claim 14, further comprising driving means for supplying to said moving means pulses for driving said pulse motor.

16. A system according to claim 14, wherein said control means controls the amount of current supplied to said pulse motor, wherein the amount of current supplied after stabilization of movement of reading means is less than the amount of current supplied before stabilization of movement of said reading means.

17. An image processing system comprising:
   reading means for reading an image of an original line by line, said reading means repeating the reading operation at a predetermined cycle;
   moving means for moving an image reading position of said reading means in accordance with a driving signal; and
   driving mans for supplying to said moving means the driving signal for moving the image reading position of said reading means by a pitch line during a time period of the reading operation of a line;
   external computer means for generating a signal for instructing resumption of image reading by said reading means after interruption of the image reading; and control means for controlling said reading means, said moving means and said driving means in accordance with an instruction by said external computer means, and wherein said control means causes said driving means to initiate supply of the driving signal to said moving means before the reading operation, upon reception of the image reading resumption signal generated from said external computer means.

18. A system according to claim 17, wherein said driving means stops movement of the image reading position by said moving means in accordance with an image reading interruption instruction by said computer means, and starts movement of the image reading position by said moving means in accordance with an image reading start instruction by said computer means.

19. A system according to claim 17, further comprising memory means for storing an image signal generated from said reading means at the time of termination of a preceding image reading, and wherein the image signal stored in said memory means is output in response to an initiation of a subsequent image reading.

20. A system according to claim 17, wherein said driving means initiates supply of the driving signal to said moving means in accordance with an image reading start instruction provided by said external computer means.

21. A system according to claim 17, wherein said reading means comprises a charge-accumulating image sensor, and wherein said image sensor repeats a charge-accumulating function operation at the predetermined cycle.

22. A system according to claim 17, wherein said moving means moves the image reading position of said reading means with a pulse motor.

23. A system according to claim 22, wherein said driving means supplies to said moving means the pulses for driving said pulse motor.

24. A system according to claim 22, further comprising control means for controlling an amount of current to be supplied to said pulse motor, wherein the amount of current supplied at the time of initiation of the image reading is selected to be less than an amount of current during the movement of the image reading position.

* * * * *

UNITED STATES PATENT AND TRADEMARK OFFICE
CERTIFICATE OF CORRECTION

PATENT NO. : 5,239,393

DATED : August 24, 1993

INVENTOR(S) : YUKITOSHI TAKEUCHI

Figure 1:
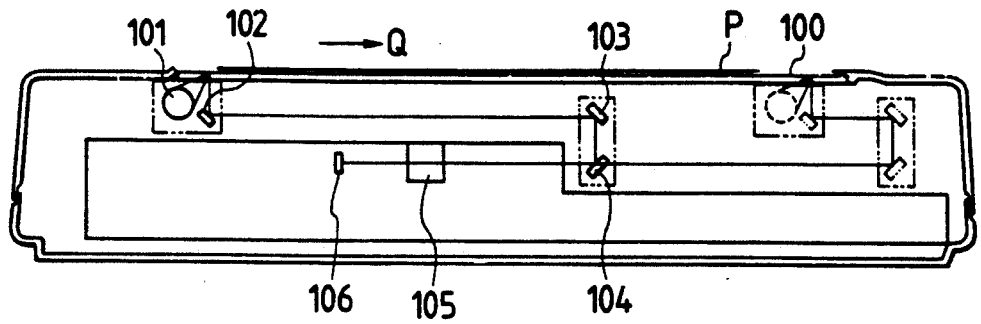
FIG. 1 is a schematic view to illustrate the example of composition of an image reading apparatus (image scanner) of the present invention.
Figure 2:
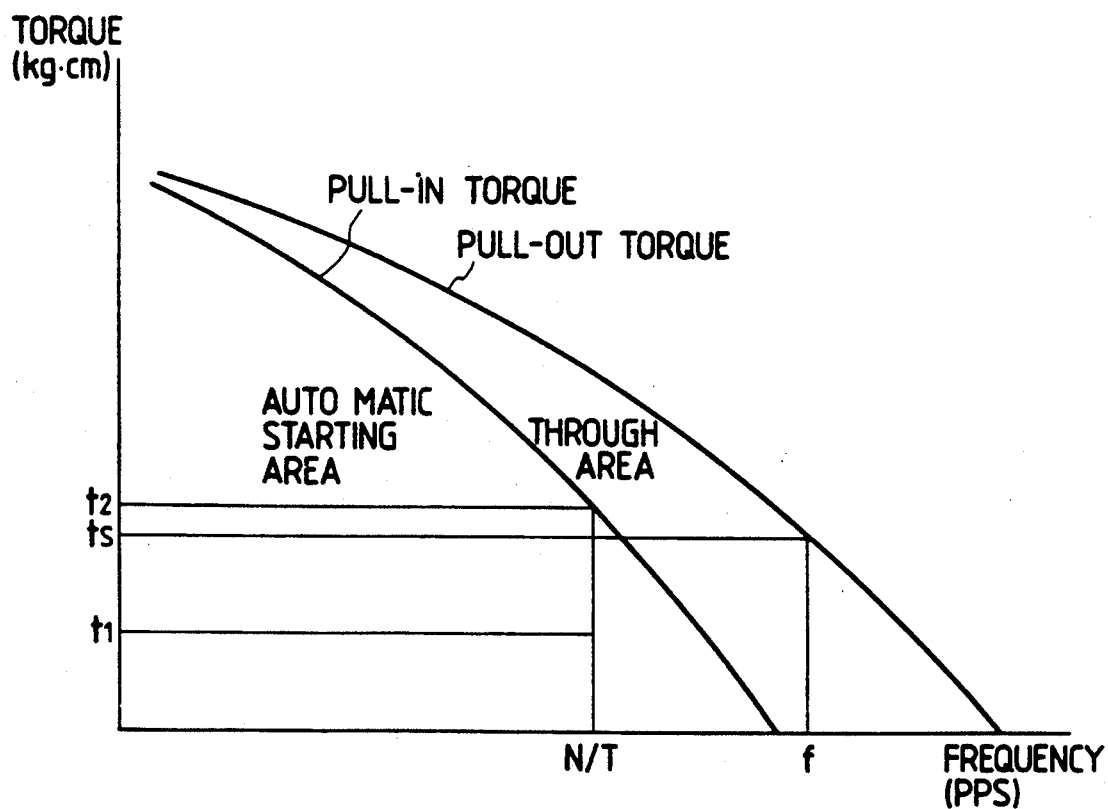
FIG. 2 shows a frequency-torque characteristic curve of a pulse motor.

It is certified that error appears in the above-identified patent and that said Letters Patent is hereby corrected as shown below:

COLUMN 1
    Line 17, "a" should read --an--.
    Line 23, "FIG. 1. The" should read --FIG. 1, the--.
    Line 34, "mirror 103" should read --mirrors 103--.
    Line 54, "said" should be deleted.
    Line 60, "the temporary" should read --temporarily--.

COLUMN 2
    Line 21, "interruption" should read --interruption,--; "s" should read --a--.
    Line 24, "pulses" should read --pulse--.
    Line 32, "said" should be deleted.
    Line 43, "(Kg cm)" should read --(Kg·cm)--.

Figure 3A:
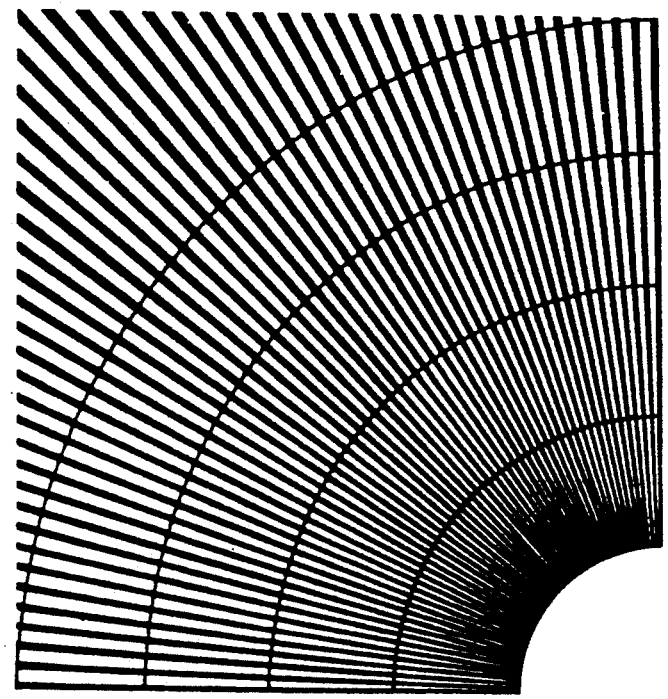
FIG. 3A is a view illustrating an original wherein radial lines are drawn.
Figure 3B:
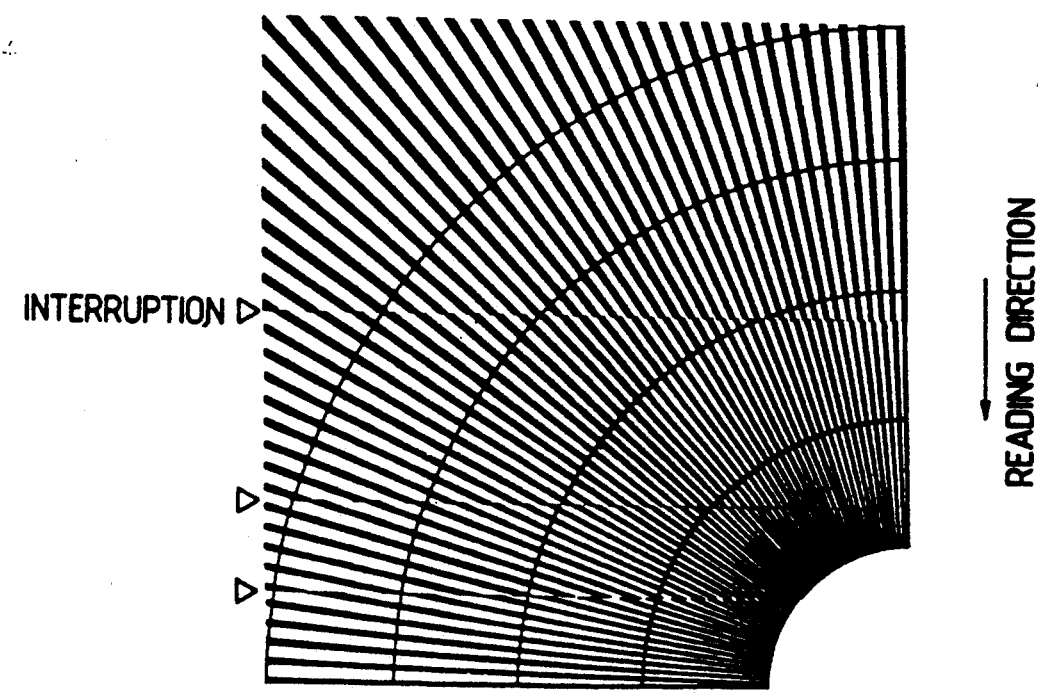
FIG. 3B is a view illustrating an example of output obtained by reading the original of the said FIG. 3(a) by the scanner of a conventional apparatus.

COLUMN 3
    Line 25, "the said FIG. 3(a)" should read --FIG. 3A--.
    Line 30, "the block" should read --block--.
    Line 38, "the" should be deleted.
    Line 41, "FIGS. 9(a-d)" should read --FIGS. 9(A-D)--.
    Line 55, "read" should read --a read--.

COLUMN 4
    Line 3, "reflects" should read --reflect--.
    Line 21, "certain" should read --a certain--.
    Line 30, "being" should be deleted.
    Line 36, "said" should be deleted.
    Line 39, "scanning the" should read --scanning of the--.
    Line 49, "a" should read --the--.
    Line 52, "mechanism" should read --mechanism,--.
    Line 53, "tape" should read --takes--.

UNITED STATES PATENT AND TRADEMARK OFFICE
CERTIFICATE OF CORRECTION

PATENT NO. : 5,239,393

DATED : August 24, 1993

INVENTOR(S) : YUKITOSHI TAKEUCHI

It is certified that error appears in the above-identified patent and that said Letters Patent is hereby corrected as shown below:

COLUMN 5
    Line 23, "host" should read --the host--.
    Line 25, "driving" should read --the driving--.
    Line 34, "host" should read --the host--.
    Line 45, "abreviated" should read --abbreviated--.
    Line 60, "distrubance" should read --a disturbance--.

COLUMN 6
    Line 3, "synchrosignal" should read --synchro-signal--.
    Line 22, "circuit 27" should read --circuit 29--.
    Line 28, "done so," should read --done,--.
    Line 35, "on the" should read --on, the--.
    Line 51, "degraded" should read --degraded,--.
    Line 57, "practiced," should read --practiced--.

COLUMN 7
    Line 22, "explanation" should read --the explanation--.
    Line 30, "time $t_2$" should read --time t2--.
    Line 34, "shows" should read --show--.
    Line 43, "it" should read --its--.
    Line 50, "pulse" should read --the pulse--.
    Line 62, "extention" should read --extension--.
    Line 64, "the vibration of" should read --vibration of the--.
    Line 65, "suppress;" should read --suppress--.
    Line 67, "said" should be deleted.

COLUMN 8
    Line 10, "transistor tr1" should read --transistors tr1--.
    Line 34, "second" should read --the second--.
    Line 45, "of to" should read --to--.
    Line 67, "to" should be deleted.

UNITED STATES PATENT AND TRADEMARK OFFICE
CERTIFICATE OF CORRECTION

PATENT NO. : 5,239,393

DATED : August 24, 1993

INVENTOR(S) : YUKITOSHI TAKEUCHI

It is certified that error appears in the above-identified patent and that said Letters Patent is hereby corrected as shown below:

COLUMN 10
    Line 2, "RAM," should read --RAM 30,--.
    Line 3, "RAM" should read --RAM 30--.
    Line 9, "on" should read --so on--.
    Line 11, "on." should read --so on.--.
    Line 18, "host" should read --the host--.
    Line 26, "area 1," should read --areas 1,--.
    Line 31, "RAM, 30" should read --RAM 30--.

COLUMN 11
    Line 2, "image" should read --the image--.
    Line 10, "said" should be deleted.
    Line 11, "deformations" should read --variations--.
    Line 12, "claim" should read --claims.--.

COLUMN 12
    Line 1, "image" should read --an image--.
    Line 9, "image" (first occurrence) should read --means--.
    Line 29, "aid" should read --said--.
    Line 63, "mans" should read --means--.

Signed and Sealed this

Twenty-fourth Day of May, 1994

*Attest:*

BRUCE LEHMAN

*Attesting Officer*     Commissioner of Patents and Trademarks